(12) United States Patent
Etzenbach et al.

(10) Patent No.: US 6,503,315 B1
(45) Date of Patent: Jan. 7, 2003

(54) PROCESS FOR PRODUCING IRON OXIDE PIGMENTS

(75) Inventors: Norbert Etzenbach, Köln (DE); Kai Bütje, Duisburg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 22 days.

(21) Appl. No.: 09/718,272

(22) Filed: Nov. 22, 2000

(30) Foreign Application Priority Data

Dec. 2, 1999 (DE) .......................... 199 58 168

(51) Int. Cl.[7] .................... C09C 1/20; C04B 16/00; C01G 49/02
(52) U.S. Cl. .................. 106/456; 106/712; 423/632; 423/633
(58) Field of Search .................. 106/456, 712; 423/632, 633

(56) References Cited

U.S. PATENT DOCUMENTS

| | | | | |
|---|---|---|---|---|
| 4,378,252 A | * | 3/1983 | Kiemle et al. | 106/456 |
| 5,049,195 A | * | 9/1991 | Burow et al. | 106/456 |
| 5,421,878 A | * | 6/1995 | Lerch et al. | 106/456 |

OTHER PUBLICATIONS

Chemical Abstracts 128:218378n, Preparation of Crystal Seeds of Iron Oxide Red by Nitric Acid Method and its Effect on Oxidation. (1997).

* cited by examiner

*Primary Examiner*—Elizabeth D. Wood
(74) *Attorney, Agent, or Firm*—Joseph C. Gil; Thomas W. Roy

(57) ABSTRACT

The present invention relates to a process for producing iron oxide red pigments containing the step of forming a suspension of haematite nuclei by reaction between dilute nitric acid and elemental iron above 90° C. and to pigments of pure color and their use.

6 Claims, No Drawings

PROCESS FOR PRODUCING IRON OXIDE PIGMENTS

BACKGROUND OF THE INVENTION

1. Field of the invention

The present invention relates to a process for producing iron oxide red pigments of pure color and to these pigments and the use thereof.

2. Description of the prior art

Processes for producing red iron oxide pigments have been published in: T. C. Patton, Pigment Handbook, Vol.1, New York 1988. In addition, in: SHEN, Qing; SUN, Fengzhi; Wujiyan Gongye 1997, (6), 5–6 (CH), Wujiyan Gongye Bianjib, (CA 128:218378n) a process is reported in which dilute nitric acid acts on elemental iron at elevated temperature, whereby a suspension of haematite nuclei is formed. It is known how to transform such a suspension into a suspension of red pigment and recover the pigment. However, the red pigments produced by this process have a comparatively low color saturation and for that reason are used principally in the building materials industry.

Accordingly, an object of the present invention is to provide improved iron oxide red pigments which have the advantage of the simple method of producing nuclei described by Shen et al., but not the disadvantage of the inadequate color purity.

It has now been found that the relatively high demands of the market on iron oxide red pigments are met by maintaining the reaction temperature of the nucleus formation not at 86° C., as recommended by Shen et al., but at above 90° C.

SUMMARY OF THE INVENTION

The present invention relates to a process for producing iron oxide red pigments, by suspension of haematite nuclei by reaction between dilute nitric acid and elemental iron above 90° C., converting the suspension of haematite nuclei to a suspension of haematite pigment and optionally recovering the pigment as a solid.

The present invention further relates to pigments having a color saturation (C*) of more than 39 CIELAB units in the color testing.

The invention also relates to the use of these pigments for the coloring of concrete, plastics, paints, lacquers, and substrates thus colored or coated.

DETAILED DESCRIPTION OF THE INVENTION

In a preferred embodiment of the process according to the invention, in order to prepare the suspension of nuclei a) elemental iron is placed in water at a reaction temperature of 90° C. to 99° C., particularly preferably 95° C. to 99° C. In another preferred embodiment of the process according to the invention, b) elemental iron is reacted with nitric acid having a concentration of 2 to 6 wt. % $HNO_3$, In another preferred embodiment of the process according to the invention iron and nitric acid are reacted, c) in a molar ratio Fe: $HNO_3$ of 1.5 to 16.

This results in a red suspension of nuclei. The suspended particles are shown by an X-ray phase analysis to consist solely of haematite.

The elemental iron is preferably scrap iron, particularly preferably in the form of sheets.

The conversion process can further contain the step of transforming the suspension of haematite nuclei into a suspension of haematite pigment by reaction with iron(II) salt and alkali metal hydroxide and exposure to oxygen-containing gases.

The conversion process can further contain the step of transforming the suspension of haematite nuclei into a suspension of haematite pigment with elemental iron, iron (II) salt and oxygen-containing gases The pigment formation can advantageously be carried out in two ways. Either metallic iron and iron(II) salt are added to the suspension of nuclei, the whole mixture is heated to 70° C. to 100° C., preferably 75° C. to 90° C. and oxidized with 0.2 to 50 l air per hour and per liter of suspension until the required hue is attained, or the suspension of nuclei is heated to 70° C. to 100° C., preferably 75° C. to 90° C., iron(II) salt and alkaline solution are added and the whole mixture is oxidized with 1 to 400 l air per hour and per liter of suspension until the required hue is attained.

After the brine has been separated off, the red paste can be transformed into a slurry or dried and ground to form a pulverulent pigment. Soft iron oxide pigments of pure color are obtained. Alpha-$Fe_2O_3$ is identified by X-ray phase analysis (ASTM No.: 33.0664).

Preferably, the iron oxide red pigments have a color saturation C* in the color testing of more than 40 CIELAB units.

Preferably concrete and plastics extrudates and automobile lacquers are colored with the pigments according to the invention. Plastics extrudates, according to the invention, also include toners used for electromechanical printing processes and colored with these pigments; the paints include emulsion paints and inks for ink-jet printers.

The pigments according to the invention can be granulated in known manner and applied in this form.

The color testing of the pigments for applications in the field of coatings is carried out in an alkyd resin with 63% linseed oil and 23% phthalic anhydride, (Alkydal L 64, Bayer AG, Leverkusen, DE) to which 5% Luvotix HT additive (Lehmann & Voss) is added in order to increase the viscosity. The volume concentration of the pigment is 10%.

The CIELAB data (DIN 6174) are determined using an Ulbricht globe photometer (illumination conditions d/8°, standard illuminant C/2°) including the surface reflection. The color saturation (C*) is regarded as a measure of the color purity of the pigments.

EXAMPLES

Example 1

1,773 g of iron sheet were placed in 24 l water under 300 l/h nitrogen gas and heated to 95° C. 1,445.1 g of 34.6 wt. % nitric acid were added thereto over a period of one hour. The mixture was then left to react for 30 minutes. A suspension of haematite nuclei was formed. The nuclei were not recovered and the suspension was subsequently used in the state in which it was obtained.

Example 2

685 g of Fe sheet, 70 g $Fe_2O_3$ nuclei (solid substance) from Example 1, 4 liters of water and 175 g $FeCl_3$ were stirred at 200 rev/min under 100 l/h $N_2$ gas and heated to 70° C. The gassing was then changed to 100 l/h air and aeration was carried out for 100 hours.

Example 3

0.26 mol $Fe_2O_3$ nuclei (solid substance) from Example 1, 4.94 mol $FeCl_2$ and 6.3 liters of water were placed under 100 l/h nitrogen gas and heated to 90° C. The pH value was adjusted to 2.0 by means of sodium hydroxide solution over a period of five minutes and oxidized at this pH by aeration with 150 l/h air for 15 hours.

TABLE 1

| Description of type | Absolute values in L 64 pure hue | | | |
|---|---|---|---|---|
| | L* | a* | b* | C* |
| Example 2 | 42.2 | 30.6 | 26.9 | 40.8 |
| Example 3 | 41.1 | 31.7 | 26.1 | 41.1 |
| 750/99/1[1] | 41.2 | 28.8 | 22.2 | 36.4 |
| Bayferrox 4100[2] | 39.7 | 29.6 | 23.7 | 37.9 |

[1] Haematite pigment, typical Chinese commercial products
[2] Bayferrox 4100, haematite pigment, Bayer AG, Leverkusen, DE Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing iron oxide red pigments which comprises forming a suspension of haematite nuclei by reaction between dilute nitric acid and elemental iron at above 90° C., converting the suspension of haematite nuclei to a suspension of haematite pigment and optionally recovering the pigment as a solid.

2. The process of claim 1, wherein the reaction temperature is above 95° C.

3. The process of claim 1, wherein the concentration of the nitric acid is 2 to 6 wt. % $HNO_3$.

4. The process of claim 1, wherein the molar reaction ratio Fe:$HNO_3$ is 1.5 to 16.

5. The process of claim 1, wherein the suspension of haematite nuclei is converted into a suspension of haematite pigment by reaction with iron(II) salt and alkali metal hydroxide and exposure to oxygen-containing gases.

6. The process of claim 1, wherein the suspension of haematite nuclei is converted into a suspension of haematite pigment with elemental iron, iron(II) salt and oxygen-containing gases.

* * * * *